United States Patent
Kirkman

[11] Patent Number: 6,098,427
[45] Date of Patent: Aug. 8, 2000

[54] NECK RING MECHANISM FOR GLASS FORMING MACHINE

[75] Inventor: Thomas R. Kirkman, Walbridge, Ohio

[73] Assignee: Owens-Brockway Glass Container Inc., Toledo, Ohio

[21] Appl. No.: 09/181,596

[22] Filed: Oct. 29, 1998

[51] Int. Cl.[7] .................................................. C03B 9/16
[52] U.S. Cl. .............................. 65/261; 65/232; 65/236; 65/240; 65/264; 65/323; 65/359; 65/361; 425/450.1; 425/541
[58] Field of Search .............................. 65/232, 234, 236, 65/240, 261, 264, 323, 359, 361; 425/450.1, 541

[56] References Cited

U.S. PATENT DOCUMENTS

| | | | |
|---|---|---|---|
| 3,233,999 | 2/1966 | Mumford . | |
| 3,249,418 | 5/1966 | Irwin et al. ............................... | 65/361 |
| 3,617,233 | 11/1971 | Mumford ................................. | 65/307 |
| 4,533,377 | 8/1985 | Liebert . | |
| 4,637,827 | 1/1987 | Nebelung et al. . | |
| 4,842,636 | 6/1989 | Libert ...................................... | 65/232 |
| 5,569,313 | 10/1996 | Meyer ..................................... | 65/361 |
| 5,578,105 | 11/1996 | Meyer ..................................... | 65/361 |

*Primary Examiner*—Stanley S. Silverman
*Assistant Examiner*—Michael P. Colaianni

[57] ABSTRACT

A neck ring arm assembly for a glass container forming machine of the individual section type comprising a horizontally extending invert shaft and a vertically extending cylinder with a rack that engages a spur gear attached to the invert shaft to oscillate the invert shaft. The invert shaft has an inner annular sleeve keyed to it, and the inner annular sleeve has a polygonal exterior, preferably a hexagonal exterior. First and second outer annular sleeves surround the inner annular sleeve to be oscillatable therewith, but reciprocable with respect thereto. Each of the first and second outer annular sleeves has a polygonal interior which is complementary to the polygonal exterior of the inner annular sleeve, and each is provided with a plurality of replaceable wear pads each of which is adjustable toward a surface of the polygonal exterior of the inner annular sleeve to provide for close, low backlash engagement of the inner annular sleeve by the outer annular sleeves over a prolonged duration. A neck ring carrying arm, made up of a pair of neck ring arm elements each of which is secured to one of the outer annular sleeves, is provided to carry the neck rings and container parisons as the neck ring arm assembly is moved from the blank mold of an I.S. machine to the blow mold side by the motion of the invert shaft in a first arcuate direction, and to carry the neck rings back to the blank mold side after releasing the parisons to blow molds at the blow mold side by arcuate motion in an opposed arcuate direction.

26 Claims, 6 Drawing Sheets

NECK RING MECHANISM FOR GLASS FORMING MACHINE

FIELD OF THE INVENTION

This invention relates to a neck ring mechanism for a glass forming machine of the individual section (I.S.) type. More particularly, this invention relates to an improved invert shaft element, which is often referred to as a rock shaft, and to the attachment of the arm segments of the neck ring mechanism to such invert shaft element.

BACKGROUND OF THE INVENTION

U.S. Pat. No. 3,617,233 (Mumford), which was assigned to a predecessor of the assignee of this application, the disclosure of which is incorporated by reference herein, describes a glass forming machine of the I.S. type, which is a type of forming machine that is widely used in forming various types of hollow glass containers. As described in the '233 patent or as is otherwise known, an I.S. machine has a multitude of side-by-side machine sections, such as six, eight, ten or even twelve sections, and containers are formed in each section, usually two, three or four at a time, in a two-step process. In the first of the steps, preforms of the containers, which are often called parisons or blanks, are formed by pressing or blowing gobs of molten glass in a first set of molds, often called blank molds, with each container parison being formed in an inverted orientation, that is, with its open end down. Each set of blank molds is made up of a separable pair of semi-cylindrical mold elements, which remain in end to end contact with one another throughout the blank molding step.

During the forming of glass parisons in an I.S. machine blank mold, the "finish" portion of the parison, which is the threaded or otherwise configured closure receiving portion at the open end, is formed by a separate annular neck mold, which is often referred to as a neck ring, each of which is made up of a separable pair of generally semi-cylindrical elements. The neck rings for each I.S. machine section are carried in a neck ring mechanism and remain in closing contact with the parisons at the conclusion of the blank molding step, when the elements of the blank molds separate to allow the parisons to be transferred to a second set of molds, often referred to as blow molds, for the blowing of parisons into containers in the final desired shape of the containers. The containers are held by the neck rings during their transfer from the blank molds to the blow molds, and the transfer is effected by inverting the neck ring mechanism through an arc of 180° to present the parisons, which remain grasped by the neck rings throughout the transfer step, at the blow molds, the parisons now being in upright orientations, with the finishes at the top, as a result of the inverting step.

When the parisons arrive at the blow molds, they are released by the neck rings to permit the neck ring mechanism to revert to its location at the blank mold station, by a movement in a reverse arc of 180°, to begin a repeat of the two-step manufacturing process. The neck ring mechanism is made up of a separable side by side pair of arm segments, and the segments separate at the blow mold station, which causes the elements of the neck ring assembly that are carried by the neck ring mechanism to separate, to thereby release the parisons into the blow molds. The alternate separation and rejoining of the neck ring mechanism arm elements is accomplished by a reciprocating motion of each element with respect to a horizontal shaft which passes through an end portion of such arm element, and the oscillation of the neck ring mechanism is caused by oscillating the shaft, which is often referred to as an invert shaft or a rock shaft, through an arc of 180°, each arm element being rotatable with, but not with respect to, the invert shaft. Another version of a neck ring mechanism for an I.S. glass forming machine is disclosed in U.S. Pat. No. 3,233,999 (Mumford), which was also assigned to a predecessor of the assignee of this application, the disclosure of which is also incorporated by reference herein.

Prior art neck ring mechanisms typically used spline connections between the arm elements and the invert shaft to permit sliding motion of the arm elements relative to the shaft while ensuring that the arm elements oscillate with the shaft. Such spline connections are subject to backlash, however, thus making precise positioning of the neck ring assembly arm elements with respect to one another difficult to achieve, and this factor, which can lead to improperly formed container finishes, worsens with usage due to wear. This requires frequent replacement of the neck ring mechanism, replacement of one or more of its elements being impractical, which involves a shutdown of the machine section for a prolonged duration with a loss of its productive capacity.

Another problem encountered with prior art neck ring mechanisms that involved a splined connection between the invert shaft and the neck ring arm elements is that the reciprocation of the arm elements relative to the invert shaft typically is primarily spring actuated, pneumatic actuation not being reliable due to air leakage in use because of the inability to properly seal a splined shaft against such leakage.

SUMMARY OF THE INVENTION

To correct the aforesaid and other problems associated with prior art I.S. machine neck ring mechanisms, there is provided a neck ring mechanism that does not rely on a splined connection between the invert shaft and the neck ring arm elements which are slidingly mounted on the invert shaft. The invert shaft of the present invention has a replaceable annular element whose exterior has the shape of a polygon, illustratively, a hexagon, and the neck ring mechanism arm segments which are slidingly mounted on the polygonal element have annular openings with complementary polygonal shaped openings for engaging the polygonal element of the invert shaft. Further, the neck ring mechanism arm elements have wear pads that are adjustable and replaceable on at least some of the sides of the polygon, illustratively, four such wear pads in the case of an invert shaft having a hexagonal configuration, to ensure close, relatively backlash-free contact between the neck ring mechanism arm elements and the invert shaft over a long period of time. This arrangement also provides a relatively simple procedure for replacing only the wear pads, and/or the polygonal element on the invert shaft, as opposed to the entire neck ring mechanism, when the wear pads can no longer be adjusted to ensure proper operation within acceptable backlash limits.

The neck ring mechanism according to the present invention also utilizes pneumatic pressure for both opening and closing neck ring arm elements with respect to one another, with springs to assist in closing such elements, and to ensure that they remain closed in the event of the loss of air pressure. The use of a non-splined connection between the invert arm shaft and the neck ring mechanism arm elements carried thereby provides a large surface area to ensure that the pneumatic forces are sufficiently large to reliably and rapidly effect the opening action, and permits the pneumatic elements to be reliably sealed to thereby prevent loss of actuating air and to facilitate proper lubrication of the wear pads that provide sliding engagement between the neck ring mechanism elements and the invert shaft by a closed lubricant recirculating system.

Accordingly, it is an object of the present invention to provide an improved neck ring mechanism for a glass forming machine of the I.S. type. More particularly, it is an object of the present invention to provide a neck ring mechanism of the foregoing character that is readily adjustable from time to time to minimize backlash between its constituent elements. It is also an object of the present invention to provide a neck ring mechanism of the foregoing character whose constituent elements can be replaced, when needed, without the need to replace other elements of the neck ring mechanism that otherwise do not need to be replaced.

For a further understanding of the present invention and the objects thereof, attention is directed to the drawing and the following brief description thereof, to the detailed description of the preferred embodiment and to the appended claims.

DETAILED DESCRIPTION OF THE PREFERRED EMBODIMENT

Figure 1:
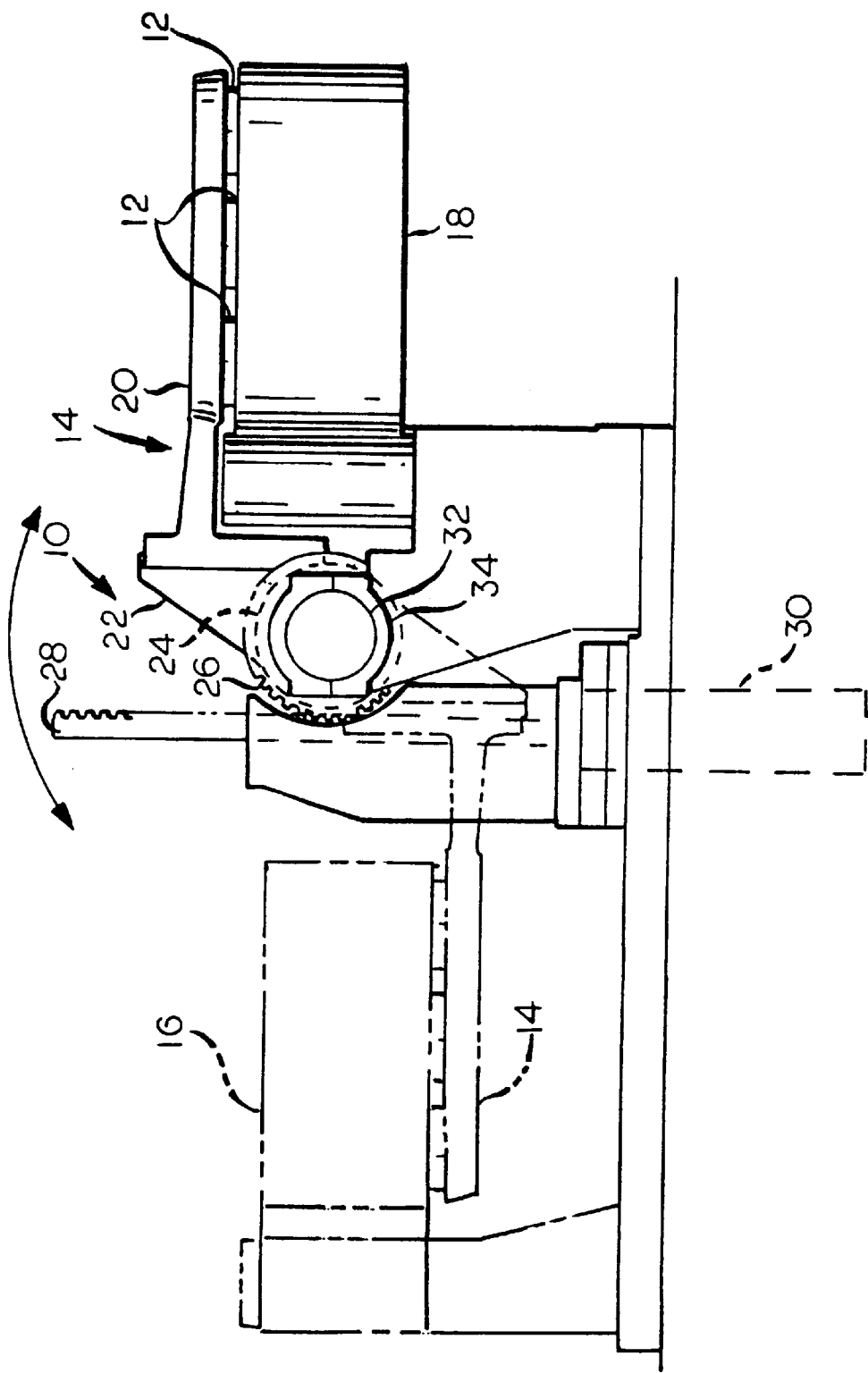
FIG. 1 is a schematic end elevational view of a section of an I.S. glass forming machine having a neck ring mechanism according to the preferred embodiment of the present invention, the neck ring mechanism being shown in solid line in one of its operating positions and in broken line in another of its operating positions.

FIG. 1 illustrates a section of a glass forming machine of the I.S. type, which is generally indicated by reference numeral 10, in which one or more, usually a plurality and shown as three neck rings 12, are carried by a neck ring arm assembly, shown generally by reference numeral 14, are used to grasp the finish portions of glass parisons while they are being formed by pressing or blowing at a blank molding station 16. The neck ring arm assembly 14 is then used to transfer the parisons to a blow molding station 18 by a 180° turning action, in a clockwise direction in the arrangement shown in FIG. 1. When the parisons arrive at the blow molding station 18 they are released by the neck ring arm assembly 14, and the neck ring arm assembly 14 then reverts to the blank molding station 16 to begin a repeat of its role in the two-step glass container manufacturing process which is characteristic of the manufacture of glass containers by an I.S. machine.

The neck ring arm assembly includes a neck ring arm 20, which is actually a side by side pair of neck ring arms, as we shall see later, and the neck ring arm assembly 20 extends horizontally in each of its end positions, namely its illustrated positions at the blank molding station 16 and the blow molding station 18. The neck ring arm elements of the neck ring arm 20 are removably secured at right angles to flanges 22 of a spaced apart pair of sleeves 24 of a neck ring arm assembly according to the preferred embodiment of the present invention, and the sleeves 24 have a spur gear 26 positioned therebetween. The neck ring arm 20 is caused to oscillate between its end positions, as illustrated by an arrow A, by the reciprocation of a rack 28. The rack 28 is powered by a pneumatic cylinder 30 which may be of conventional construction. The sleeves 24 are held against an invert shaft 32 by wear pads, as will be hereinafter described more fully, in a way to be rotatable with, but not with respect to, the shaft 32, and the shaft 32 is rotatably supported in bearings 34 at each of its ends. As illustrated in the drawing, the spur gear 26 has teeth on less than the entirety of its circumference, because it need not make a complete oscillation to be able to oscillate the neck ring arm assembly 14 through its required arc of 180°.

The shaft 32 has a spaced apart pair of annular sleeves 36 keyed (FIG. 5) or otherwise secured to the shaft 32 so as to be rotatable with, but not with respect to, the shaft 32. The exterior of each of the sleeves 36 is polygonal in configuration, hexagonal in the illustrated embodiment, and each of the sleeves 24 is slidably concentrically positioned around one of the sleeves 36. Each of the sleeves 24 has a polygonal interior configuration so as to be rotatable with, but not with respect to, the sleeve 36 which it concentrically surrounds.

Figures 3, 5:
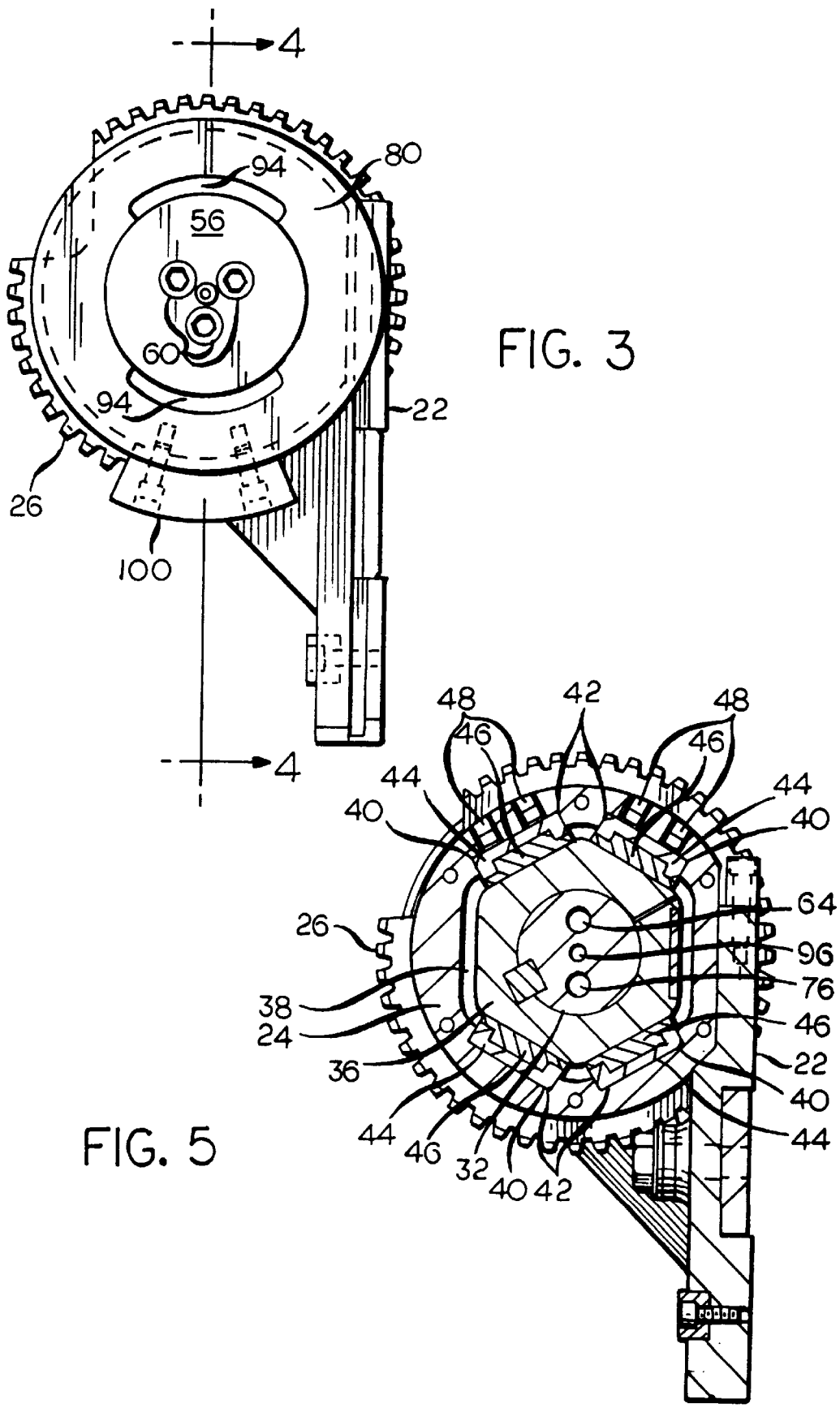
FIG. 3 is an end view of the neck ring mechanism of FIG. 2 taken from the end at the right of the invert arm mechanism as shown in FIG. 2.
FIG. 5 is a sectional view taken on line 5—5 of FIG. 2.
Figure 8:
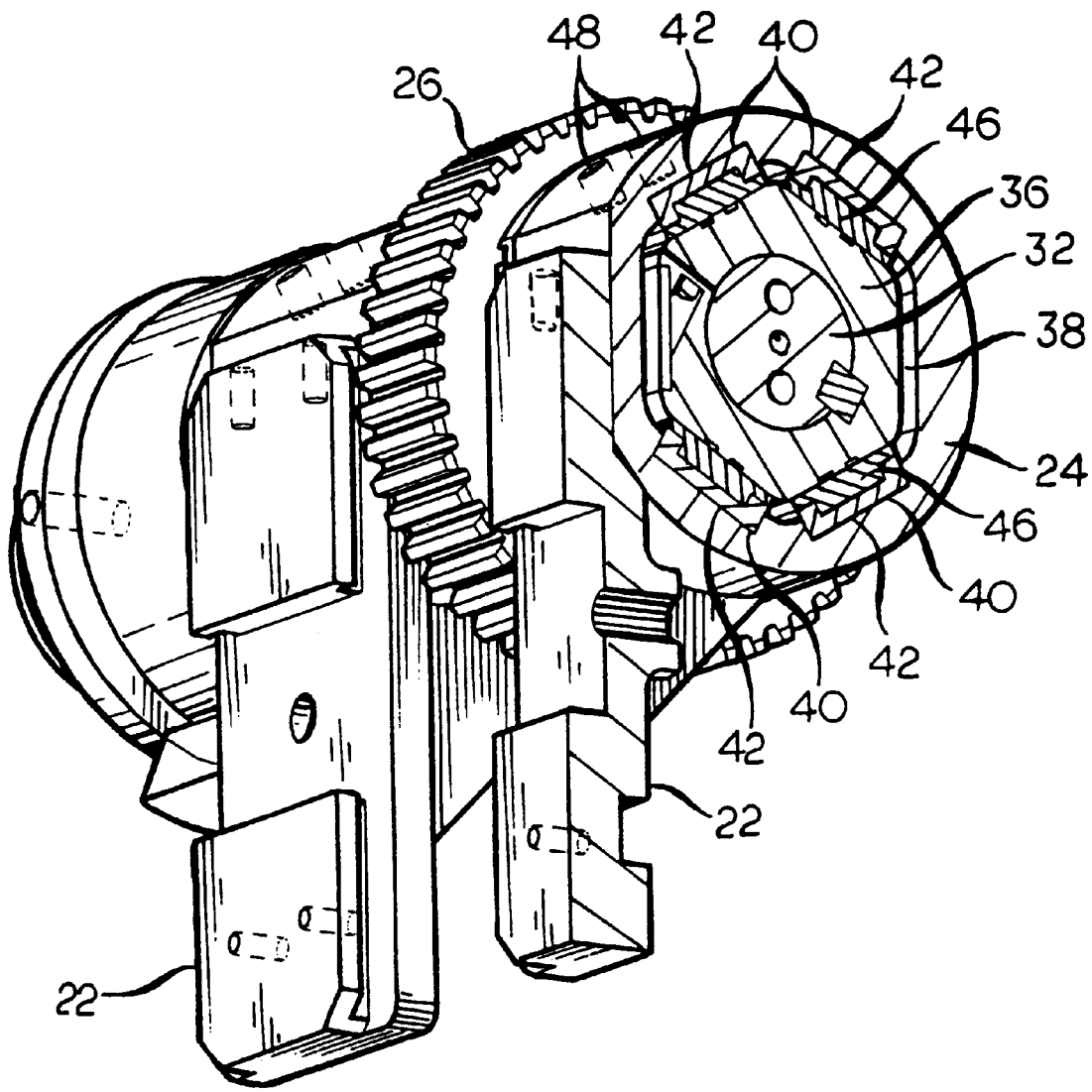
FIG. 8 is a perspective sectional view taken on line 8—8 of FIG. 4.

As is shown in FIGS. 5 and 8, the polygonal interior of the sleeve 24 has a shape corresponding to the polygonal exterior of the annular sleeve 36, but is somewhat larger than the exterior of the annular sleeve 36 to define an annular space 38 therewith. Snug engagement of the annular sleeve 36 by the sleeve 24 is obtained by providing the sleeve 24 with a plurality of recesses 40 in its interior, shown as four such recesses, in an arrangement in which the corresponding polygonal shapes of the sleeve 24 and the annular sleeve 36 are hexagonal. Each of the recesses 40 has a wear pad assembly 42 inserted therein. Each wear pad assembly 42 has a generally C-shaped wear pad holding bracket 44 with a durable wear pad 46 contained in the bracket 44. For example, each wear pad 46 may be, and preferrably is, molded from a carbon fibre impregnated polyamide resin. The wear pad assemblies 42 are positioned to enable the sleeve 24 to snugly engage the annular sleeve 36 at opposed locations and are adjustable toward the annular sleeve 36 by externally accessible setscrews 48 to enable the wear pad assemblies to be advanced toward the annular sleeve 36 from time to time to compensate for any wear experienced by the wear pads 46. Through the use of the setscrews 48, the wear pad assemblies 42 are independently adjustable relative to the annular sleeve 36, to ensure which the sleeve 24 can be concentrically positioned with respect to the annular sleeve 36, regardless of any wear experienced by any of the wear pads 46.

Figure 2:
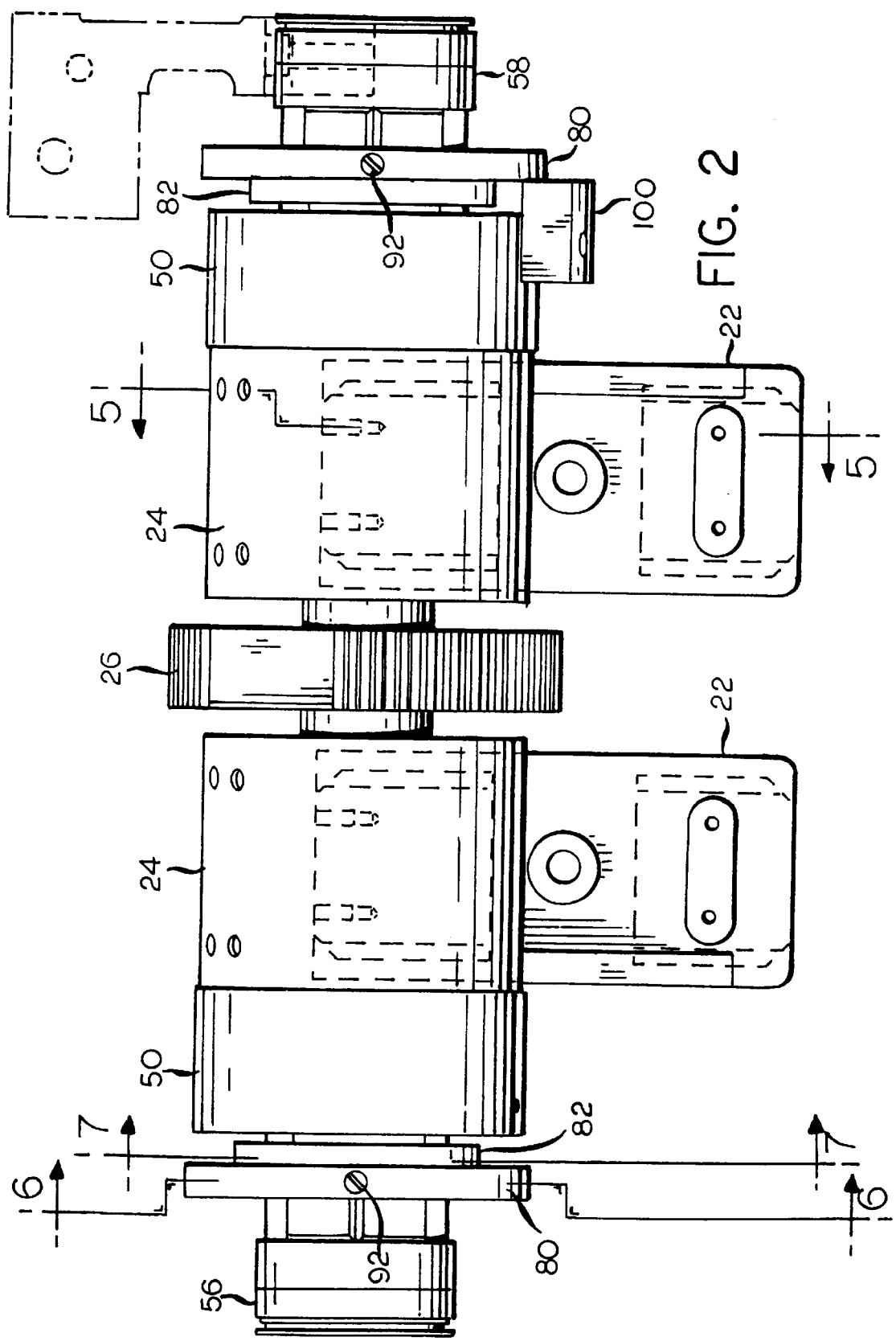
FIG. 2 is a plan view, at an enlarged scale, of the neck ring mechanism of FIG. 1 in its broken line position in FIG. 1.

The useful life of the neck ring arm assembly 14 can be extended relative to the useful life of conventional neck ring arm assemblies using a splined connection between the neck ring arm elements and the invert shaft by advancing the wear pad assemblies 42 toward the annular sleeve 36 to compensate for wear experienced by the wear pads 46, as noted. The useful life can also be extended, after the useful life of the wear pads 46, because the wear pad assemblies 42 are readily replaceable in service by removing an end cap assembly 50 at each end of the neck ring arm assembly 14, as shown in FIG. 2, each end cap assembly being removably secured to an adjacent sleeve 24 by a plurality of readily accessible bolts 52.

Figure 4:
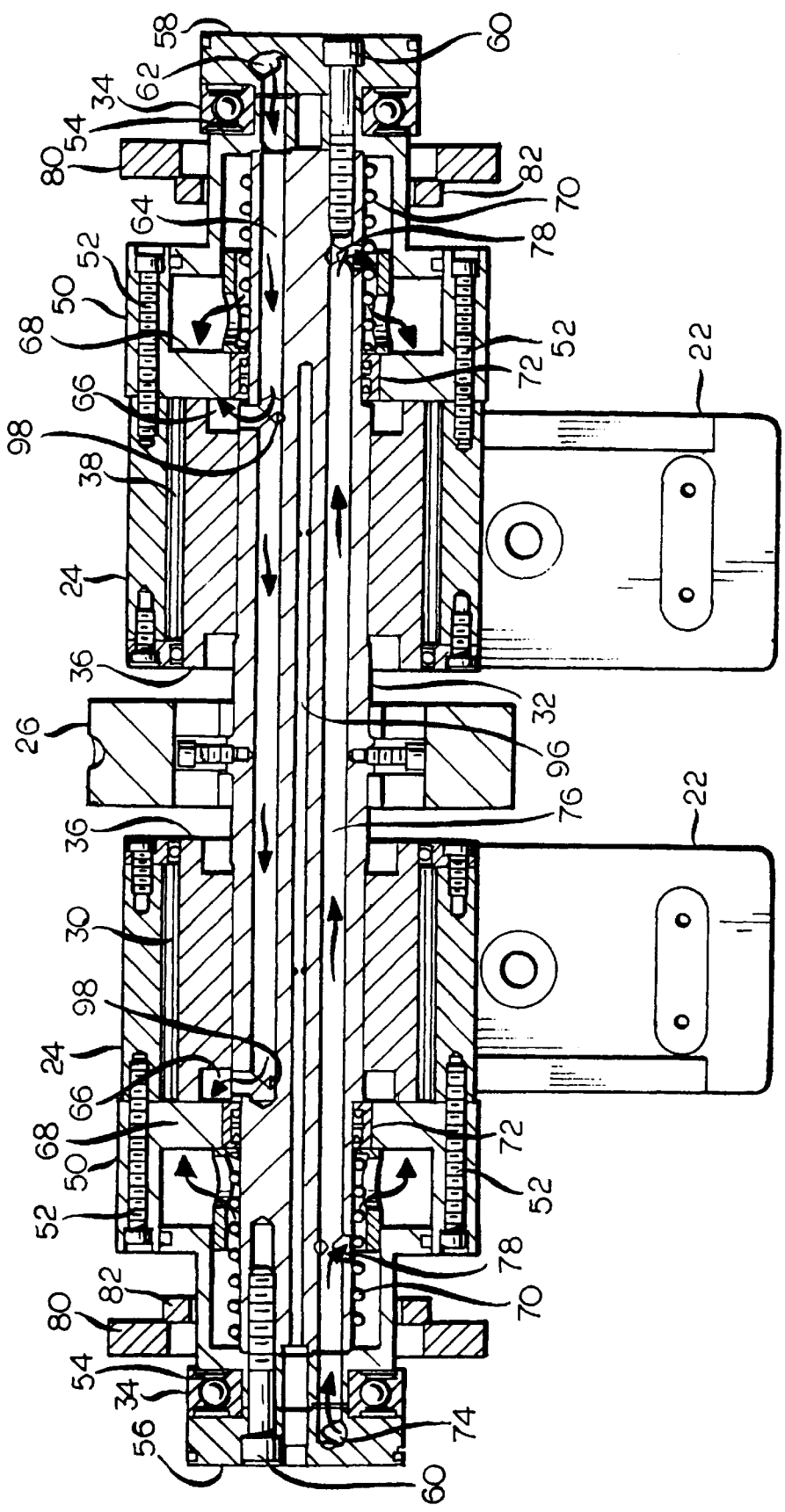
FIG. 4 is a sectional view taken on line 4—4 of FIG. 3.
Figure 6:
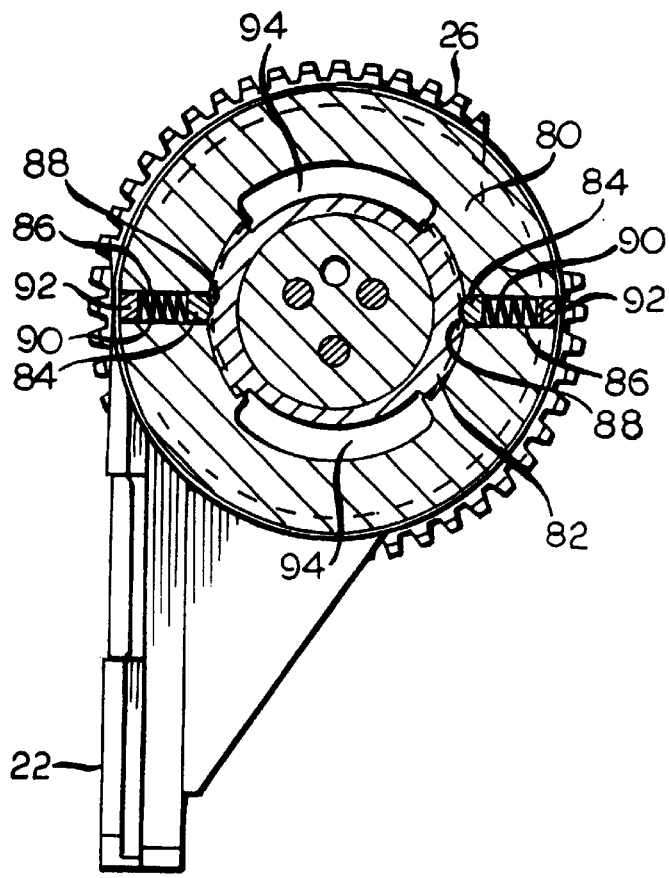
FIG. 6 is a sectional view taken on line 6—6 of FIG. 2.
Figure 7:
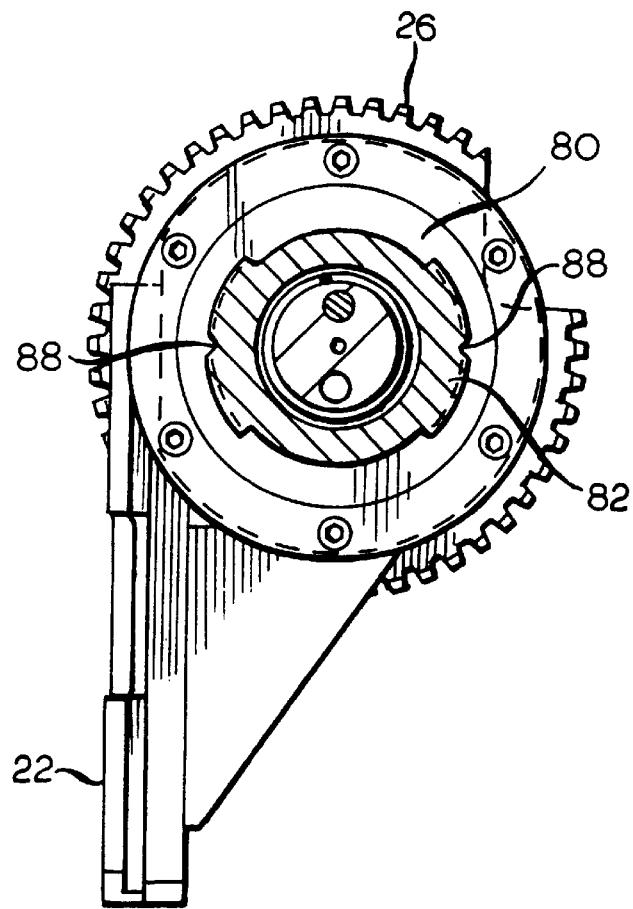
FIG. 7 is a sectional view taken on line 7—7 of FIG. 2.

The bearings 34 are held in place against the exterior of the radial shoulders of generally hat-shaped members 54 by end closure members 56 (left side of FIG. 4), 58 (right side of FIG. 4) each of which is removably secured to the adjacent hat-shaped member by externally accessible bolts 60 which extend into the invert shaft 32. Compressed air to simultaneously reciprocate the sleeves 24 in opposing directions, to permit parisons to be received in blow molds as described, enters through a port 62 in one of the end closure members 56, 58, shown as the end closure member 58, and flows into a longitudinal passage 64 in the invert shaft 32. Compressed air in the passage 64 exits through radial ports 66 in the invert shaft 32 to act against the interior surfaces of radial flanges 68 of the end cap assemblies 50 to thereby bias the sleeves 24 away from one another, against the action of coil springs 70 contained in the end cap assemblies 50 and adjacent hat-shaped members 54. The coil springs 70 bear against the exterior surfaces of the radial flanges 68, and also ensure that the sleeves 24 will be returned to their closed (innermost) positions in the event of the loss of a source of compressed air to the neck ring arm assembly 14. In which regard, sliding seals 72 are provided between the interior surfaces of the radial flanges 68 and the invert shaft 32 to permit the sleeves 24 to reciprocate relative to the invert shaft 32 without loss of air pressure. The use of such sliding seals 72 also permits all portions of the neck ring arm assembly 14 therebetween to be continuously lubricated by a lubricating oil from a closed system, as will be hereinafter described more fully.

Similarly, compressed air to simultaneously close the sleeves 24, upon the start of the revert movement of the neck ring arm assembly 14 from the blow molding station 18 to the blank molding station 16, enters through a port 74 in the other of the end closure members 56, 58, shown as the end closure member 56, and flows into a second longitudinally extending passage 76 in the invert shaft 32. Compressed air in the passage 76 exits through radial ports 78 in the invert shaft 32 to act against the interior surfaces of the radial flanges 68 of the end cap assemblies 50 to thereby, with the assistance of the springs 70, rapidly and positively move the sleeves 24 toward one another.

The opening motion of the sleeves 24 is limited in extent by a spaced apart pair of adjustable stops 80, which are positioned along the longitudinal central axis of the invert shaft 32, to be contacted by a radial surface of the adjacent end cap assembly 50 when it is at the longitudinally outermost of its positions relative to the hat-shaped member 54 with respect to which it reciprocates. Each of the adjustable stops 80 is threaded onto the exterior of the underlying hat-shaped member 54, the circumferential position of a nut 82 on the invert shaft 32 determining the longitudinal position of an adjacent stop 80 with respect to the axis of the invert shaft 32. In that regard, compression springs 90 are positioned in the radial slots 86 to resiliently bias the pins 84 into engagement with the slots 88, the radial slots 86 being closed by threaded fasteners 92 inserted therein. The threaded engagement of the nut 82 by the adjustable stop 80 extends over less than 180° of the circumference of the nut 82 to permit the adjustable stop 80 to be quickly disconnected from the nut 82 by a partial turn of the adjustable stop 80 to thereupon permit it to be removed from the nut 82 by an outward longitudinal movement after it has turned to disengage its interior thread from the exterior thread of the member 54, which is also limited in its circumferential extent to less than 180° of the circumference of the nut 82.

To properly lubricate the engaging surfaces of the wear pads 46 and the invert shaft 32, the invert shaft 32 is provided with a longitudinally extending blind passage 96 to receive lubricating oil from an external source. Oil from the blind passage 96 flows through the annular space 38 and then through longitudinally spaced apart ports 98 to be carried by the pressurized air flowing through the passage 64 into the region traversed by the sleeves 24 as they reciprocate relative to the invert shaft 32, as heretofore described. If it is desired to identify the positions of the sleeves 24 as they reciprocate relative to the invert shaft 32, for example, as a glass forming machine operation control parameter, a proximity switch of otherwise conventional construction, not shown, may be mounted to a bracket 100 attached to one of the end cap assemblies 50, shown in FIG. 2 as the end cap assembly 50 at the right. The proximity switch secured to the bracket 100 will sense the position of the adjacent sleeve 24 at the outermost extent of its travel.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A neck ring arm assembly for a glass container forming machine of the individual section type, said neck ring arm assembly comprising:

an oscillatable shaft having a longitudinal axis;

an inner annular sleeve surrounding at least a portion of said oscillatable shaft, said inner annular sleeve being rotatable with, but not with respect to, said oscillatable shaft and having an exterior in the configuration of a polygon;

first and second outer annular sleeves each surrounding at least a portion of said inner annular sleeve, each of said first and second outer annular sleeves having an interior in the configuration of a polygon corresponding to the exterior shape of the inner annular sleeve;

a plurality of wear pad means carried by each of said first and second outer annular sleeves, each of said wear pad means engaging a surface of the polygonal exterior of said inner annular sleeve;

each of said first and second outer annular sleeves being rotatable with, but not with respect to, said inner annular sleeve and being reciprocable in unison in opposed directions with respect to and along the longitudinal axis of said inner annular sleeve;

means for oscillating said oscillatable shaft; and means for reciprocating said first and second outer annular sleeves in unison in opposed directions along said longitudinal axis of said oscillatable shaft means with respect to said inner annular sleeve.

2. A neck ring arm assembly according to claim 1 wherein said means for reciprocating comprises:

first and second compression springs resiliently acting on said first and second outer annular sleeves, respectively, to urge said first and second outer annular sleeves toward one another.

3. A neck ring arm assembly according to claim 1 and further comprising:

first and second flanges secured to said first and second outer annular sleeves, respectively, and being rotatable with and reciprocable with said first and second outer annular sleeves, respectively.

4. A neck ring arm assembly according to claim 1 and further comprising:

a plurality of means extending through each of said outer annular sleeves for adjusting the position of said plurality of wear pad means carried by said each of said outer annular sleeves to maintain engagement of said each of said plurality of wear pad means carried by said each of said outer annular sleeves and the surface of the polygonal exterior of said inner annular sleeve.

5. A neck ring arm assembly according to claim 1 wherein:

the exterior configuration of said inner annular sleeve is that of a hexagon;

the interior configuration of each of said first and second outer annular sleeves is that of a hexagon; and the plurality of wear pad means carried by each of said first and second outer annular sleeves consists of four wear pad means arranged with a pair of spaces between opposed adjacent pairs of wear pad means.

6. A neck ring arm assembly according to claim 1 wherein said means for reciprocating said first and second outer annular sleeves comprises:

a first compressed air inlet;

a first air passage receiving compressed air from said first compressed air inlet and in communication with each of said first and second outer annular sleeves for simultaneously urging said each of said first and second outer annular sleeves away from one another;

a second compressed air inlet; and a second air passage receiving compressed air from said second compressed air inlet and in communication with each of said first and second outer annular sleeves for simultaneously urging said each of said first and second outer annular sleeves toward one another.

7. A neck ring arm assembly according to claim 1 and further comprising:

first and second adjustable stop means spaced apart from one another along a longitudinal central axis of said oscillatable shaft for limiting the travel of said first and second outer annular sleeves, respectively, away from one another during their motion with respect to said inner annular sleeve.

8. A neck ring arm assembly according to claim 7 wherein each of said adjustable stop means comprises:

a nut having a threaded interior threadably secured in an axially adjustable position with respect to said inner annular sleeve; and a stop releasably secured to said nut, said stop being positioned to limit the outward travel of an adjacent one of said first and second outer annular sleeves.

9. A neck ring arm assembly according to claim 1 wherein:

each of said plurality of wear pad means comprises a hard, wear resistant wear pad engaging said surface of the polygonal exterior of said inner annular sleeve, said wear pad being formed of a carbon fiber impregnated organic material.

10. A neck ring arm assembly according to claim 9 wherein:

said organic material is comprised principally of a polyamide material.

11. A neck ring arm assembly according to claim 1 wherein said means for oscillating said oscillatable shaft comprises:

a spur gear secured to said oscillatable shaft to be oscillatable with, but not with respect to, said oscillatable shaft; and means in engagement with said spur gear for oscillating said spur gear and said oscillatable shaft.

12. A neck ring arm assembly according to claim 11 wherein said means in engagement with said spur gear comprises:

a rack; and means for reciprocating said rack.

13. A neck ring assembly according to claim 12 wherein:

said oscillatable shaft extends generally horizontally; and said rack extends generally vertically.

14. A neck ring arm assembly for a glass container forming machine of the individual section type, said neck ring arm assembly comprising:

an oscillatable shaft means having an exterior in the configuration of a polygon and a longitudinal axis;

first and second outer annular sleeves each surrounding said exterior of said oscillatable shaft means; each of said first and second outer annular sleeves having an interior in the configuration of a polygon corresponding to said exterior of said oscillatable shaft means;

a plurality of wear pad means carried by each of said first and second outer annular sleeves, each of said wear pad means engaging a surface of the polygonal exterior of said oscillatable shaft means;

each of said first and second outer annular sleeves being rotatable with, but not with respect to, said oscillatable shaft mean; and being reciprocable in unison in opposed directions with respect to and along the longitudinal axis of said oscillatable shaft means;

means for oscillating said oscillatable shaft means; and means for reciprocating said first and second outer annular sleeves in unison in opposed directions along said longitudinal axis of said oscillatable shaft means with respect to said oscillatable shaft means.

15. A neck ring arm assembly according to claim 14 wherein said means for reciprocating comprises:

first and second compression springs resiliently acting on said first and second outer annular sleeves, respectively, to urge said first and second outer annular sleeves toward one another.

16. A neck ring arm assembly according to claim 14 and further comprising:

first and second flanges secured to said first and second outer annular sleeves, respectively, and being rotatable with and reciprocable with said first and second outer annular sleeves, respectively.

17. A neck ring arm assembly according to claim 14 and further comprising:

a plurality of means extending through each of said outer annular sleeves for adjusting the position of said plurality of wear pad means carried by said each of said outer annular sleeves to maintain engagement of said each of said plurality of wear pad means carried by said each of said outer annular sleeves and the surface of the polygonal exterior of said at least a portion of the exterior of said oscillatable shaft means.

18. A neck ring arm assembly according to claim 14 wherein:

the exterior configuration of said exterior of said oscillatable shaft means is that of a hexagon;

the interior configuration of each of said first and second outer annular sleeves is that of a hexagon; and the plurality of wear pad means carried by each of said first and second outer annular sleeves consists of four wear pad means arranged with a pair of spaces between opposed adjacent pairs of wear pad means.

19. A neck ring arm assembly according to claim 14 wherein said means for reciprocating said first and second outer annular sleeves comprises:

a first compressed air inlet;

a first air passage receiving compressed air from said first compressed air inlet and in communication with each of said first and second outer annular sleeves for simultaneously urging said each of said first and second outer annular sleeves away from one another;

a second compressed air inlet; and a second air passage receiving compressed air from said second compressed air inlet and in communication with each of said first and second outer annular sleeves for simultaneously urging said each of said first and second outer annular sleeves toward one another.

20. A neck ring arm assembly according to claim 14 and further comprising:

first and second adjustable stop means spaced apart from one another along a longitudinal central axis of said oscillatable shaft means for limiting the travel of said first and second outer annular sleeves, respectively, away from one another during their motion with respect to said exterior of said oscillatable shaft means.

21. A neck ring arm assembly according to claim 20 wherein each of said adjustable stop means comprises:

a nut having a threaded interior threadably secured in an axially adjustable position with respect to said oscillatable shaft means; and a stop releasably secured to said nut, said stop being positioned to limit the outward travel of an adjacent one of said first and second outer annular sleeves.

22. A neck ring arm assembly according to claim 14 wherein:

each of said plurality of wear pad means comprises a hard, wear resistant wear pad engaging said surface of the polygonal exterior of said exterior of said oscillatable shaft means, said wear pad being formed of a carbon fiber impregnated organic material.

23. A neck ring arm assembly according to claim 22 wherein:

said organic material is comprised principally of a polyamide material.

24. A neck ring arm assembly according to claim 14 wherein said means for oscillating said oscillatable shaft means comprises:

a spur gear secured to said oscillatable shaft means to be oscillatable with, but not with respect to, said oscillatable shaft means; and means in engagement with said spur gear for oscillating said spur gear and said oscillatable shaft means.

25. A neck ring arm assembly according to claim 24 wherein said means in engagement with said spur gear comprises:

a rack; and means for reciprocating said rack.

26. A neck ring assembly according to claim 14 wherein: said oscillatable shaft extends generally horizontally; and said rack extends generally vertically.

* * * * *